(12) United States Patent
Onouchi et al.

(10) Patent No.: US 11,567,016 B2
(45) Date of Patent: Jan. 31, 2023

(54) RADIOGRAPHIC IMAGING APPARATUS

(71) Applicant: Hitachi, Ltd., Tokyo (JP)

(72) Inventors: Masafumi Onouchi, Tokyo (JP); Takafumi Ishitsu, Tokyo (JP)

(73) Assignee: FUJIFILM HEALTHCARE CORPORATION, Chiba (JP)

( * ) Notice: Subject to any disclaimer, the term of this patent is extended or adjusted under 35 U.S.C. 154(b) by 111 days.

(21) Appl. No.: 17/232,217

(22) Filed: Apr. 16, 2021

(65) Prior Publication Data
US 2022/0074872 A1    Mar. 10, 2022

(30) Foreign Application Priority Data
Sep. 8, 2020   (JP) .............................. JP2020-150308

(51) Int. Cl.
*G01N 23/046*   (2018.01)
*G01N 23/083*   (2018.01)

(52) U.S. Cl.
CPC ......... *G01N 23/046* (2013.01); *G01N 23/083* (2013.01); *G01N 2223/316* (2013.01); *G01N 2223/408* (2013.01); *G01N 2223/501* (2013.01)

(58) Field of Classification Search
CPC ............... G01N 23/046; G01N 23/083; G01N 2223/316; G01N 2223/408; G01N 2223/501; A61B 6/42; A61B 6/4241; A61B 6/4266
See application file for complete search history.

(56) References Cited

U.S. PATENT DOCUMENTS

| 2007/0114426 A1* | 5/2007 | Tkaczyk ............... G01T 1/2985 |
| | | 250/370.09 |
| 2015/0262721 A1 | 9/2015 | Suzuki et al. |

FOREIGN PATENT DOCUMENTS

JP            5852540 B2     2/2016

* cited by examiner

*Primary Examiner* — Courtney D Thomas
(74) *Attorney, Agent, or Firm* — Mattingly & Malur, PC (57) ABSTRACT

There is provided a radiographic imaging apparatus capable of alignment of a detector with a collimator with a position of a radiation source fixed. The radiographic imaging apparatus includes the radiation source which irradiates a subject with radioactive rays, a plurality of detecting elements which detect photons in the radioactive rays, and a collimator which is disposed between the radiation source and the detecting elements and has a plurality of walls which form a plurality of passing holes that the radioactive rays pass. The detecting element and the collimator are aligned with each other in a direction which is orthogonal to a direction that the subject is irradiated with the radioactive rays such that a ratio or a difference between output signals from the detecting elements which are mutually adjacent with the wall being interposed falls within a predetermined range.

8 Claims, 8 Drawing Sheets

RADIOGRAPHIC IMAGING APPARATUS

CLAIM OF PRIORITY

The present application claims priority from Japanese Patent Application JP 2020-150308 filed on Sep. 8, 2020, the content of which are hereby incorporated by references into this application.

BACKGROUND OF THE INVENTION

The present invention relates to a radiographic imaging apparatus that a photon counting type detector is loaded and pertains to alignment of the photon counting type detector with a collimator to be used for removal of scattered rays.

It is possible for the photon counting type detector which adopts a photon counting system to individually count the number of photons in a radioactive ray which is incident upon each detecting element which is formed in a semiconductor layer and to measure energy of each photon, unlike an existing charge integrating type detector. Accordingly, it is possible for a photon counting CT (Computed Tomography) apparatus on which the photon counting type detector is loaded to obtain more information in comparison with a CT apparatus on which the charge integrating type detector is loaded.

In the radiographic imaging apparatus which is represented by the CT apparatus, a slit-type or grid-type collimator which is made of a heavy metal such as tungsten, molybdenum, tantalum, and so forth is disposed between a subject and a detecting element in order to suppress incidence of scattered rays which are generated in the subject and so forth upon the detecting element. However, in a case where an accuracy in alignment of the collimator with the detecting element is insufficient, a false image which is called an artifact is produced in a tomographic image that the CT apparatus generates.

A radiographic imaging apparatus which aligns the collimator with the detecting element is disclosed in Japanese Patent No. 5852540. Specifically, it is disclosed that outputs from a predetermined-numbered detecting element which is counted from a wall of a collimator are acquired at different ray source positions, one of the outputs is inverted with a midpoint between the two ray source positions being set as an axis and the detecting element is aligned with the collimator on the basis of a difference between the inverted output and another output.

SUMMARY OF THE INVENTION

However, in the radiographic imaging apparatus which is disclosed in Japanese Patent No. 5852524, it is necessary to acquire the outputs from the respective detection elements at two ray source positions for alignment of the collimator with the detecting element and thereby the man-hour which is required for alignment is increased.

Accordingly, the present invention aims to provide a radiographic imaging apparatus which makes it possible to align the collimator with the detecting element with the position of a radiation source being fixed.

According to one aspect of the present invention, there is provided a radiographic imaging apparatus which includes a radiation source which irradiates a subject with radioactive rays, a plurality of detecting elements which detect photons in the radioactive rays and a collimator which is disposed between the radiation source and the detecting elements and has a plurality of walls which form a plurality of passing holes that the radioactive rays pass, in which the detecting elements and the collimator are aligned with each other in a direction which is orthogonal to a direction that the subject is irradiated with the radioactive rays such that a ratio or a difference between output signals from the detecting elements which are mutually adjacent with the wall being interposed falls within a predetermined range.

According to the present invention, it becomes possible to provide the radiographic imaging apparatus which makes it possible to align the collimator with the detecting element with the position of the radiation source being fixed.

DETAILED DESCRIPTION OF THE PREFERRED EMBODIMENTS

In the following, embodiments of the present invention will be described with reference to the drawings. Incidentally, the radiographic imaging apparatus according to the present invention is applied to an apparatus which includes a radiation source and a radioactive ray detector which has a plurality of detecting elements for detecting photons in radioactive rays. In the following, an example that the radioactive ray is an X-ray, the radioactive ray detector is a photon counting type X-ray detector and the radiographic imaging apparatus is an X-ray CT apparatus will be described.

First Embodiment

Figure 1:
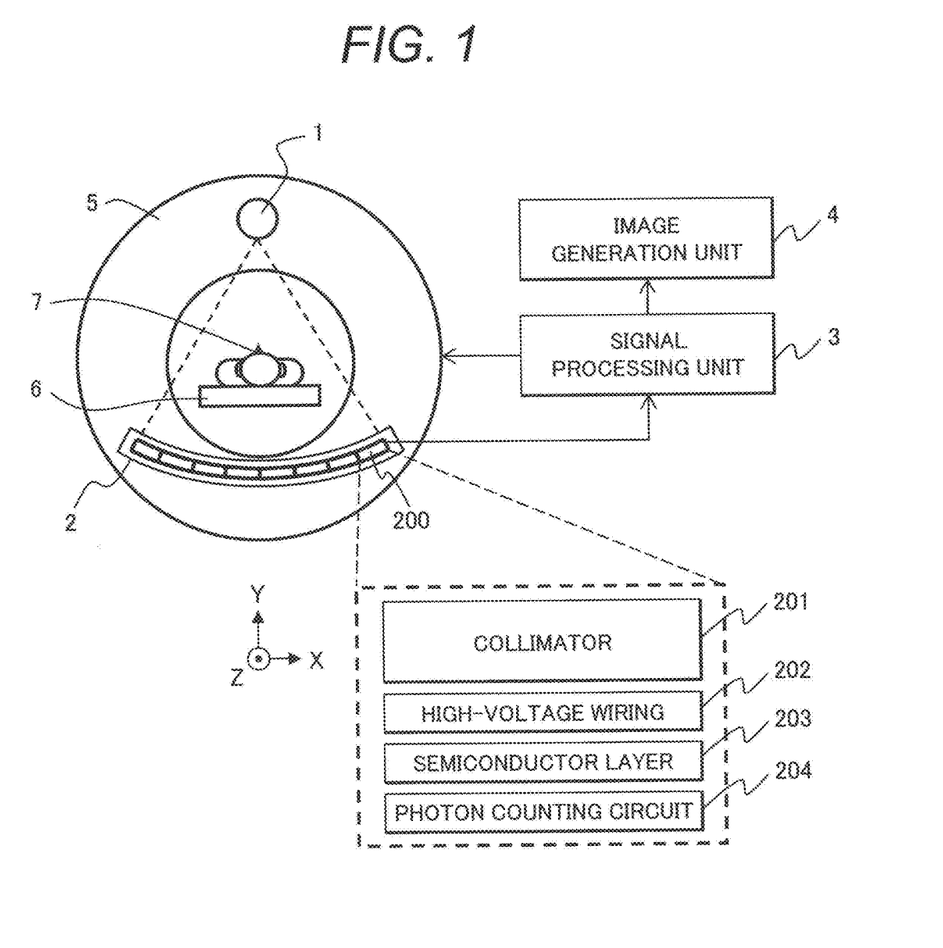
FIG. 1 is a diagram illustrating one example of an entire configuration of an X-ray CT apparatus to which the present invention is applied.

As illustrated in FIG. 1, the X-ray CT apparatus according to the first embodiment includes an X-ray source 1 which irradiates a subject 7 with X-rays, an X-ray detector 2 which has a plurality of detecting elements which detect photons in the X-rays, a signal processing unit 3, and an image generation unit 4. The signal processing unit 3 performs processing such as correction and so forth on output signals from the detecting elements and controls operations of respective units of the X-ray CT apparatus. The image generation unit 4 generates an image of the subject 7 by using the signal on which the processing such as the correction and so forth is performed by the signal processing unit 3. The X-ray source 1 and the X-ray detector 2 are configured to be supported on a rotating plate 5 at positions where the X-ray source 1 and the X-ray detector 2 mutually face and to rotate around the subject 7 who lies on a bed 6 and relative to the subject 7. Incidentally, the X-ray source 1, the X-ray detector 2 and the rotating plate 5 are also called a scanner inclusively.

The X-ray detector 2 is configured by arranging a plurality of detecting element modules 200 in an arc-shape about the X-ray source 1. The detecting element module 200 is a photon counting type detector and has a collimator 201, high-voltage wiring 202, a semiconductor layer 203, and a photon counting circuit 204. The semiconductor layer 203 is made of, for example, cadmium zinc telluride (CZT), cadmium telluride (CdTe), and so forth and generates an electric charge which corresponds to the number of photons in an X-ray which is incident upon the semiconductor layer 203. The photon counting circuit 204 counts the electric charge that the semiconductor layer 203 generates and outputs a result of counting as a counting signal. The collimator 201 is configured as a slit-type or grid-type collimator which is made of a heavy metal such as tungsten, molybdenum, and so forth and suppresses scattered rays which are incident upon the semiconductor layer 203. The high-voltage wiring 202 supplies a high voltage to the semiconductor layer 203 in order to transfer the electric charge that the semiconductor layer 203 generates to the photon counting circuit 204. A structure of the detecting element module 200 will be described later by using FIG. 2A and FIG. 2B.

X-ray irradiation from the X-ray source 1 and detection of the X-ray which passes through the subject 7 by the X-ray detector 2 are repeated while the X-ray source 1 and the X-ray detector 2 which are disposed to face each other are rotating around the subject 7. The counting signal that the photon counting circuit 204 of the X-ray detector 2 outputs is subjected to the processing such as the correction and so forth by the signal processing unit 3 and then is transmitted to the image generation unit 4. In the image generation unit 4, a tomographic image, a so-called CT image of the subject 7, is generated on the basis of the signal which is transmitted to the image generation unit 4. Incidentally, in FIG. 1, a Z-axis indicates a direction of an axis of rotation of the rotating plate 5, a Y-axis indicates an X-ray irradiation direction, and an X-axis indicates a direction which is orthogonal to a Y-Z plane. That is, the respective detecting element modules 200 which are arrayed in the arc-shape have mutually different Y-axes and X-axes.

Figure 2A:
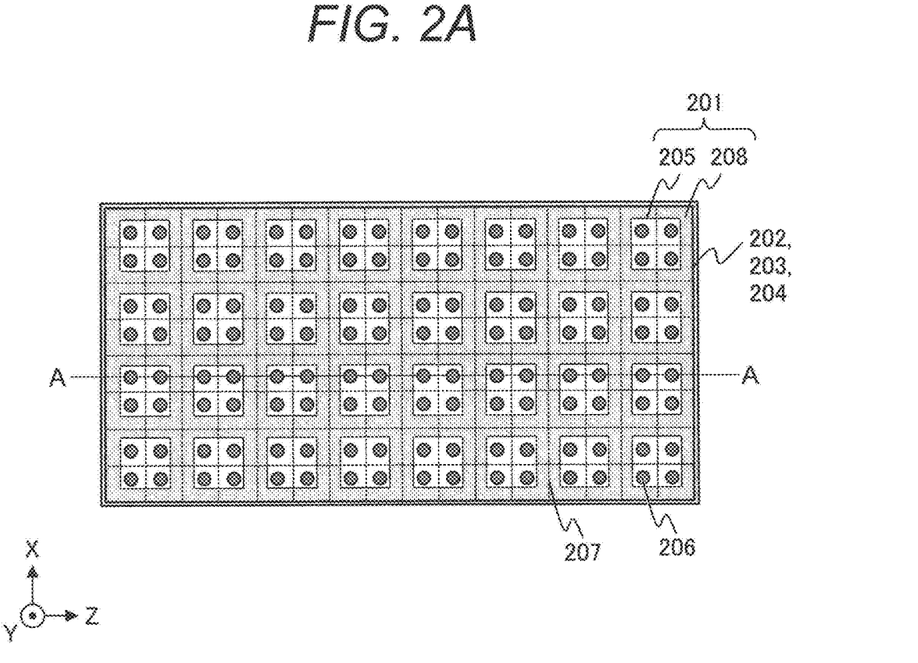
FIG. 2A is a top view illustrating one example of a detecting element module, that is, a diagram for explanation of a case where one semiconductor layer is set in correspondence with one collimator.
Figure 2B:
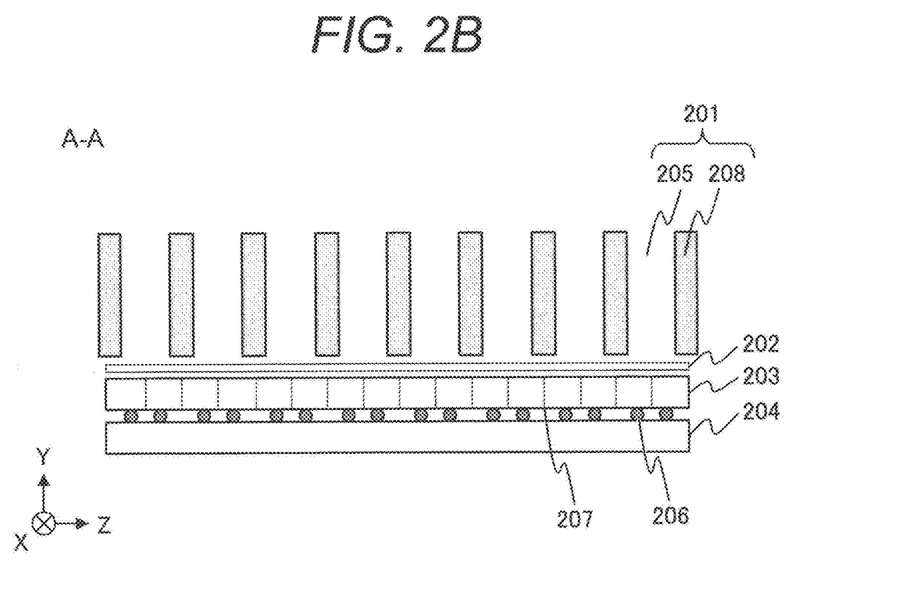
FIG. 2B is a sectional diagram taken along the A-A line in FIG. 2A.

One example of a detailed structure of the detecting element module 200 will be described by using FIG. 2A and FIG. 2B. FIG. 2A is a top view illustrating one example of the detecting element module 200. FIG. 2B is a sectional diagram taken along the A-A line in FIG. 2A. The detecting element module 200 is configured in a state where the collimator 201, the high-voltage wiring 202, the semiconductor layer 203, and the photon counting circuit 204 are piled up in this order from the X-ray source 1 side.

The collimator 201 is a two-dimensional grid which is made of a heavy metal and has a plurality of passing holes 205 which are surrounded by a wall 208. The respective passing holes 205 are formed in parallel with a direction that the subject 7 is irradiated with the X-rays, have opening areas which are equal to one another and are disposed at equal intervals. The collimator 201 may be configured by combining heavy metal plates with one another in a grid-shape and may be manufactured by a three-dimensional printer. Since the scattered rays and so forth which diagonally enter the passing hole 205 are absorbed by the wall 208, the scattered rays are suppressed at a later stage of the collimator 201.

The semiconductor layer 203 is composed of a semiconductor which generates the electric charge when the photons in the X-ray are incident. The high-voltage wiring 202 is disposed on the entire surface on the X-ray incident side of the semiconductor layer 203 and a plurality of pixel electrodes 206 are disposed on the opposite side of the semiconductor layer 203 two-dimensionally at equal intervals. An electric field is formed between the pixel electrodes 206 and the high-voltage wiring 202 by applying a high voltage to the high-voltage wiring 202, relative to the pixel electrodes 206 which are set to a voltage to ground. The electric charge which is generated in the semiconductor layer 203 is transferred to the closest pixel electrode 206 via the electric field which is formed in this way and is read out as an output signal by the photon counting circuit 204 which is connected to the pixel electrodes 206. That is, a region that the electric charge is transferred to the pixel electrodes 206 corresponds to the detecting element in the semiconductor layer 203. Incidentally, although no physical boundary is present between the detecting elements in the semiconductor layer 203, a pixel boundary 207 which is the boundary between the detecting elements is virtually indicated by a dotted line in FIG. 2A and FIG. 2B. In addition, in FIG. 2A, the position of the pixel electrode 206 on a Z-X plane is virtually indicated.

In FIG. 2A and FIG. 2B, one semiconductor layer 203 is set in correspondence with one collimator 201. In the semiconductor layer 203, eight pixel electrodes 206 are disposed in an X-direction and sixteen pixel electrodes 206 are disposed in a Z-direction. In addition, in the collimator 201, four passing holes 205 are disposed in the X-direction, eight passing holes 205 are disposed in the Z-direction, and four pixel electrodes 206 are set in correspondence with one passing hole 205.

Figure 3A:
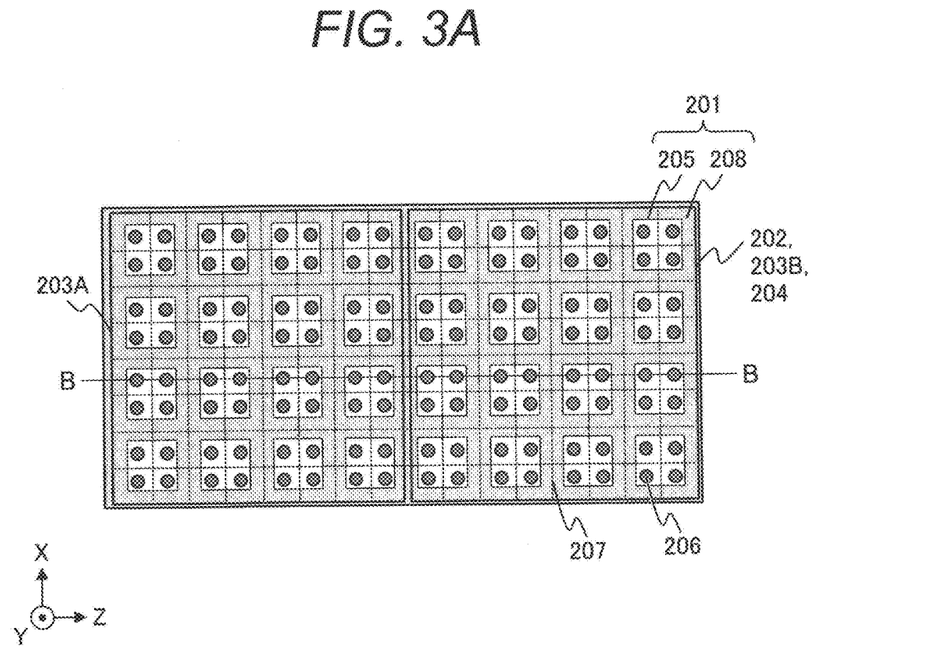
FIG. 3A is a top view illustrating another example of the detecting element module, that is, a diagram for explanation of a case where two semiconductor layers are set in correspondence with one collimator.
Figure 3B:
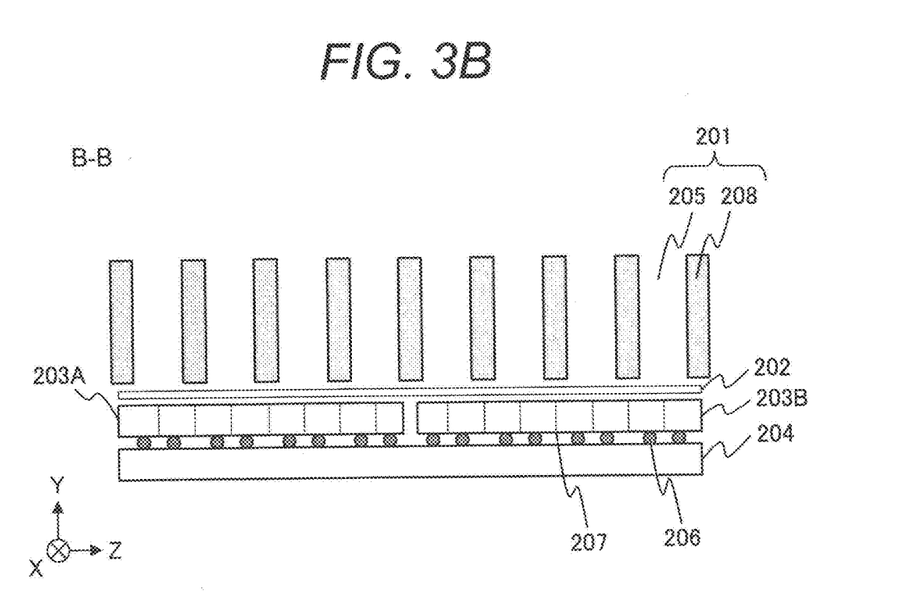
FIG. 3B is a sectional diagram taken along the B-B line in FIG. 3A.

Another example of the detecting element module 200 will be described by using FIG. 3A and FIG. 3B. The example in FIG. 3A and FIG. 3B is different from the example in FIG. 2A and FIG. 2B in that two semiconductor layers 203A and 203B which are arrayed in the Z-direction are set in correspondence with one collimator 201. In general, the more the area of the semiconductor is increased, the more the yield of the semiconductor is lowered. Accordingly, it becomes possible to improve productivity of the detecting element module 200 by dividing the semiconductor layer 203 in FIG. 2A and FIG. 2B into the semiconductor layer 203A and the semiconductor layer 203B in FIG. 3A and FIG. 3B. Incidentally, the detecting element module 200 in FIG. 3A and FIG. 3B is the same as the detecting element module 200 in FIG. 2A and FIG. 2B in other respects. That is, four pixel electrodes 206 are disposed in the X-direction, eight pixel electrodes 206 are disposed in the Z-direction, four passing holes 205 are disposed in the X-direction, and eight passing holes 205 are disposed in the Z-direction. That is, four pixel electrodes 206 are set in correspondence with one passing hole 205. It becomes possible to secure higher counting rate performance by setting the plurality of pixel electrodes 206 in correspondence with one passing hole 205.

In configurations which are exemplified in FIG. 2A, FIG. 2B, FIG. 3A, and FIG. 3B, it is desirable to align the semiconductor layer 203 with the collimator 201 with an error of, for example, about 10% or less such that the center of the passing hole 205 almost match a central part which is surrounded by the four pixel electrodes 206. In a case where an accuracy of alignment of the both is insufficient, a false image which is called an artifact is produced in the tomographic image that the CT apparatus generates. Accordingly, in the first embodiment, the semiconductor layer 203 which has the plurality of detecting elements is aligned with the collimator 201 on the basis of output signals from the detecting elements which are mutually adjacent with the wall 208 of the collimator 201 being interposed. More specifically, the semiconductor layer 203 is aligned with the collimator 201 such that a ratio or a difference between the output signals from the detecting elements which are mutually adjacent with the wall 208 being interposed falls within a predetermined range.

The output signals from the detecting elements which are mutually adjacent with the wall 208 of the collimator 201 being interposed will be described by using FIG. 4A and FIG. 4B. Incidentally, FIG. 4A is a top view illustrating one example of the detecting element module 200 that two semiconductor layers 203A and 203B are set in correspondence with one collimator 201 and the unit of coordinates of the X-axis which is a vertical-axis and the Z-axis which is a horizontal-axis is the number of the detecting elements.

Figure 4A:
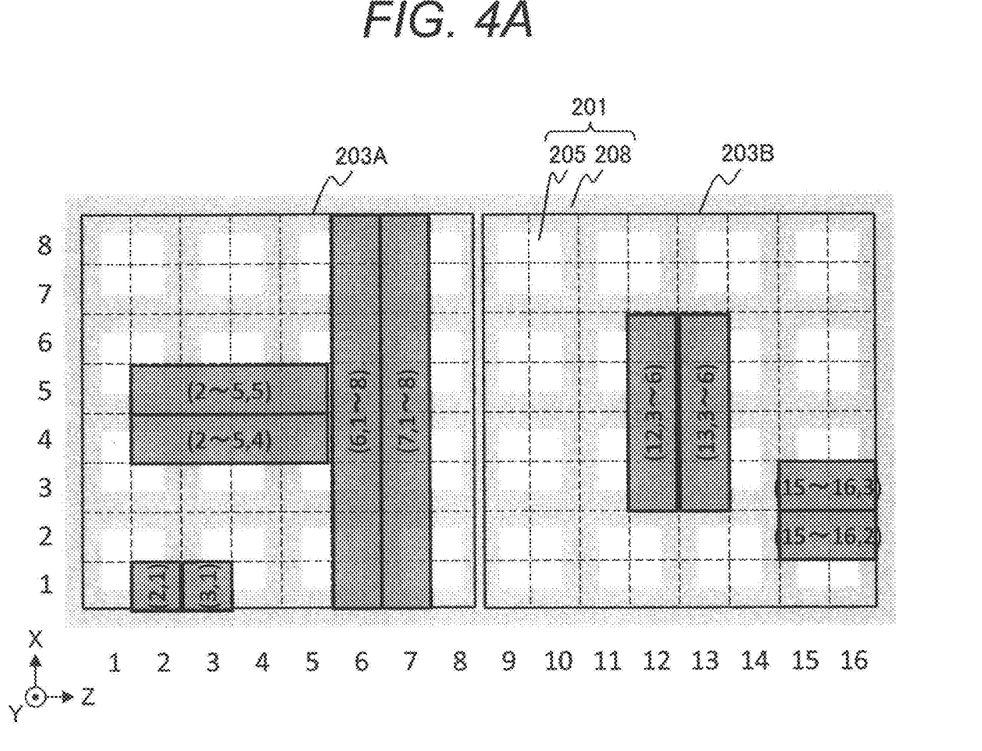
FIG. 4A is an explanatory diagram illustrating one example of detecting elements which are mutually adjacent with a wall being interposed.

In FIG. 4A, the detecting elements which are mutually adjacent with the wall 208 of the collimator 201 being interposed are exemplified. That is, a detecting element which is denoted by (2,1) and a detecting element which is denoted by (3,1) are examples of detecting elements which are mutually adjacent with the wall 208 which is located between Z=2 and Z=3 being interposed. In a case where the center of the passing hole 205 almost matches the central part which is surrounded by four pixel electrodes 206, the output signal from the detecting element (2,1) is almost equal to the output signal from the detecting element (3,1).

Figure 4B:
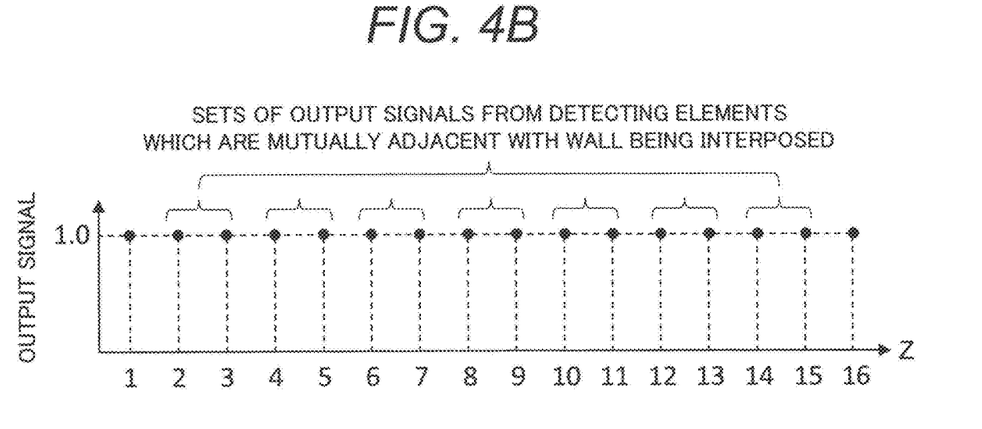
FIG. 4B is an explanatory diagram illustrating one example of output signals from the detecting elements which are mutually adjacent with the wall being interposed.

FIG. 4B illustrates one example of the output signals which are generated in a case where the semiconductor layer 203 and the collimator 201 are correctly aligned with each other and the vertical-axis indicates the output signal from each detecting element and the horizontal-axis indicates the Z-axis. As illustrated in FIG. 4B, in a case where the semiconductor layer 203 and the collimator 201 are correctly aligned with each other, values of the output signals from the respective detecting elements are equal to one another. Accordingly, in the first embodiment, the semiconductor layer 203 and the collimator 201 are aligned with each other on the basis of a set of output signals from the detecting elements which are mutually adjacent with the wall 208 being interposed. More specifically, both the semiconductor layer 203 and the collimator 201 are aligned with each other such that a ratio between output signals or a difference between relative values of the output signals from the detecting elements which are mutually adjacent with the wall 208 being interposed falls within a predetermined range, for example, a range from about 0.9 to about 1.1 in ratio, or a range from about −0.1 to about 0.1 in difference between the relative values.

Incidentally, the plurality of detecting elements which are arrayed along the wall 208 may be put together. For example, on Z=6 and Z=7, the detecting elements from X=1 to X=8 are put together and are indicated as the detecting elements which are mutually adjacent with the wall 208 which is located between Z=6 and Z=7 being interposed. In addition, on Z=12 and Z=13, the detecting elements from X=3 to X=6 are put together and are indicated as the detecting elements which are mutually adjacent with the wall 208 which is located between Z=12 and Z=13 being interposed.

Further, a direction that the plurality of detecting elements which are arrayed along the wall 208 are put together is not limited to the X-direction and the detecting elements may be put together in the Z-direction. For example, on X=2 and X=3, the detecting elements which are located on Z=15 and Z=16 are put together and are indicated as the detecting elements which are mutually adjacent with the wall 208 which is located between X=2 and X=3 being interposed. In addition, on X=4 and X=5, the detecting elements which range from Z=2 to Z=5 are put together and are indicated as the detecting elements which are mutually adjacent with the wall 208 which is located between X=4 and X=5 being interposed.

In a case where the plurality of detecting elements are put together, the values of the output signals from the respective detecting element are added together. SNR (Signal to Noise Ratio) of the output signals is improved by adding the values of the output signals together and thereby more accurate alignment of the semiconductor layer 203 with the collimator 201 becomes possible. Here, in a case where the output signals whose values are added together are noted by using the coordinates of the plurality of detecting elements which are put together and, for example, on X=4, the detecting elements which ranges from Z=2 to Z=5 are put together, the output signals whose values are added together are noted as S (2−5, 4). Incidentally, in a case where one of the output signals from the detecting elements which are mutually adjacent with the wall 208 being interposed indicates an added value, the output signal which also indicates an added value is used as the other output signal. For example, in the detecting elements which are mutually adjacent with the wall 208 which is located between Z=6 and Z=7 being interposed, added values of output signals S (6, 1−8) and S (7, 1−8) are used for alignment.

In addition, in a case where the output signals whose values are added together are used for alignment, it is desirable to exclude outermost detecting elements, specifically, a detecting element which is located on X=1 and Z=1 and a detecting element which is located on X=8 and Z=16. Since there are cases where the output signals from the outermost detecting elements are different from the output signals from the detecting elements other than the outermost detecting elements in response characteristic, more accurate alignment of the collimator 201 with the semiconductor layer 203 becomes possible by excluding the outermost detecting elements.

Figure 5A:
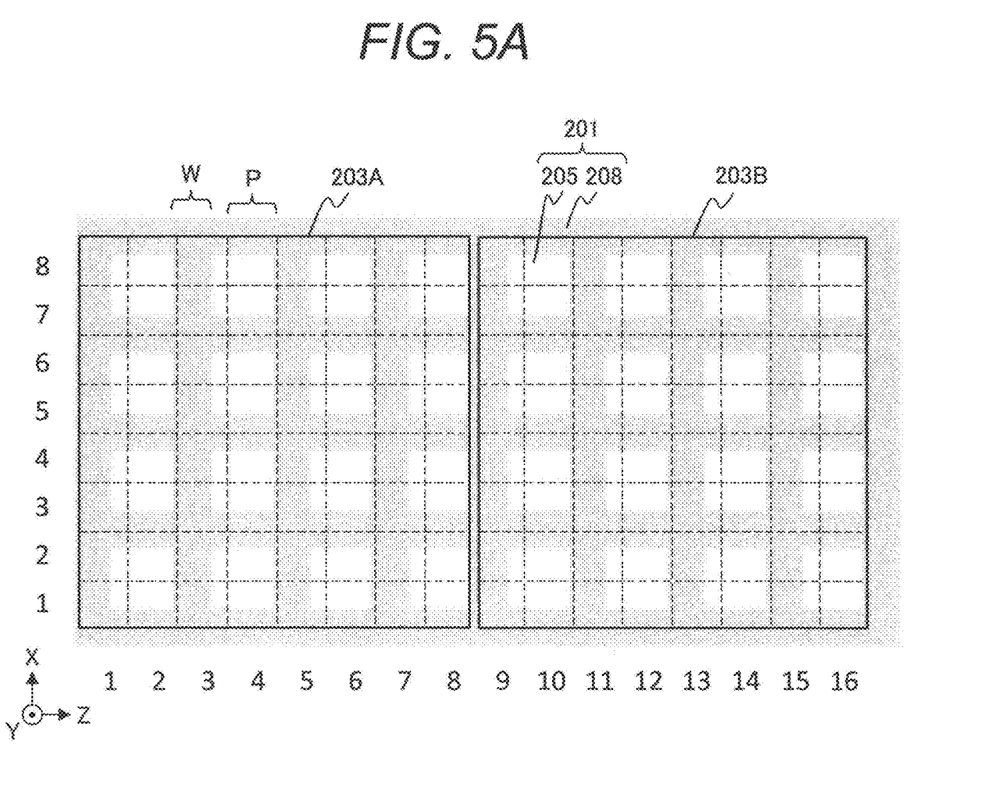
FIG. 5A is an explanatory diagram illustrating one example of a case where the collimator is out of positional alignment with semiconductor layers.
Figure 5B:
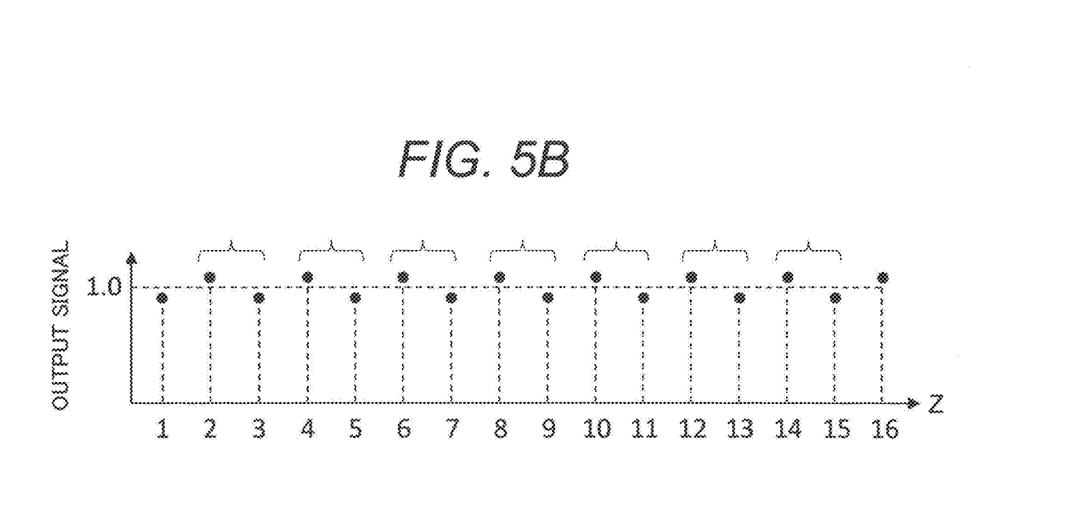
FIG. 5B is an explanatory diagram illustrating one example of output signals from the detecting elements in the case in FIG. 5A.

A case where the collimator 201 is out of alignment with both the semiconductor layer 203A and the semiconductor layer 203B in the Z-direction, that is, a case where alignment in the Z-direction is necessary will be described by using FIG. 5A and FIG. 5B. Incidentally, FIG. 5A is a top view illustrating one example of the detecting element module 200 which includes the collimator 201, the semiconductor layer 203A, and the semiconductor layer 203B and is the same as FIG. 4A in coordinate system. FIG. 5B is a diagram illustrating one example of a distribution of the output signals from the respective detecting elements in the Z-direction in the case in FIG. 5A. Incidentally, the output signals in FIG. 5B may be the output signals which are obtained from one detecting element or may each have a value which is obtained by adding together the output signals from the plurality of detecting elements. The output signals from the detecting elements having the same X-coordinate are used in both the case where the output signals are obtained from one detecting element and the case where the value is the one that the values of the output signals from the plurality of the detecting elements are added together.

In FIG. 5A, since the collimator 201 is out of alignment with the semiconductor layer 203A and the semiconductor layer 203B in the Z-direction, a difference occurs among the output signals from the respective detecting elements as illustrated in FIG. 5B. In the first embodiment, a position adjustment amount ΔAL in a direction which is orthogonal to the wall 208 is calculated by using, for example, the following formula on the basis of output signals S1 and S2 from two detecting elements which are mutually adjacent with the wall 208 being interposed.

$$\Delta AL = (P - W/2) \cdot (S1 - S2)/(S1 + S2) \quad (1)$$

Here, P is a length of one side of the detecting element and W is a thickness of the wall 208.

In a case where ΔAL which is calculated using the formula (1) has a positive value, the collimator 201 is moved by ΔAL toward the detecting element which outputs the output signal S1. For example, in a case where the output signal from the detecting element which has an even-numbered Z-coordinate is S1 and the output signal from the detecting element which has an odd-numbered Z-coordinate is S2, ΔAL has a positive value in a case where the output signals are distributed as illustrated in FIG. 5B and therefor the collimator 201 is moved in a −Z-direction that the detecting element which outputs the output signal S1 is disposed. Incidentally, the direction in which alignment is performed is not limited to the Z-direction which is described in FIG. 5A and FIG. 5B. Also, in a case where misalignment occurs in the X-direction, the collimator 201 may be moved by the position adjustment amount ΔAL in the X-direction which is calculated on the basis of the output signals S1, S2 and the formula (1) which are obtained by replacing the Z-coordinate with the X-coordinate. The calculated position adjustment amount ΔAL may be displayed on a display unit such as a liquid crystal display and so forth.

Figure 6A:
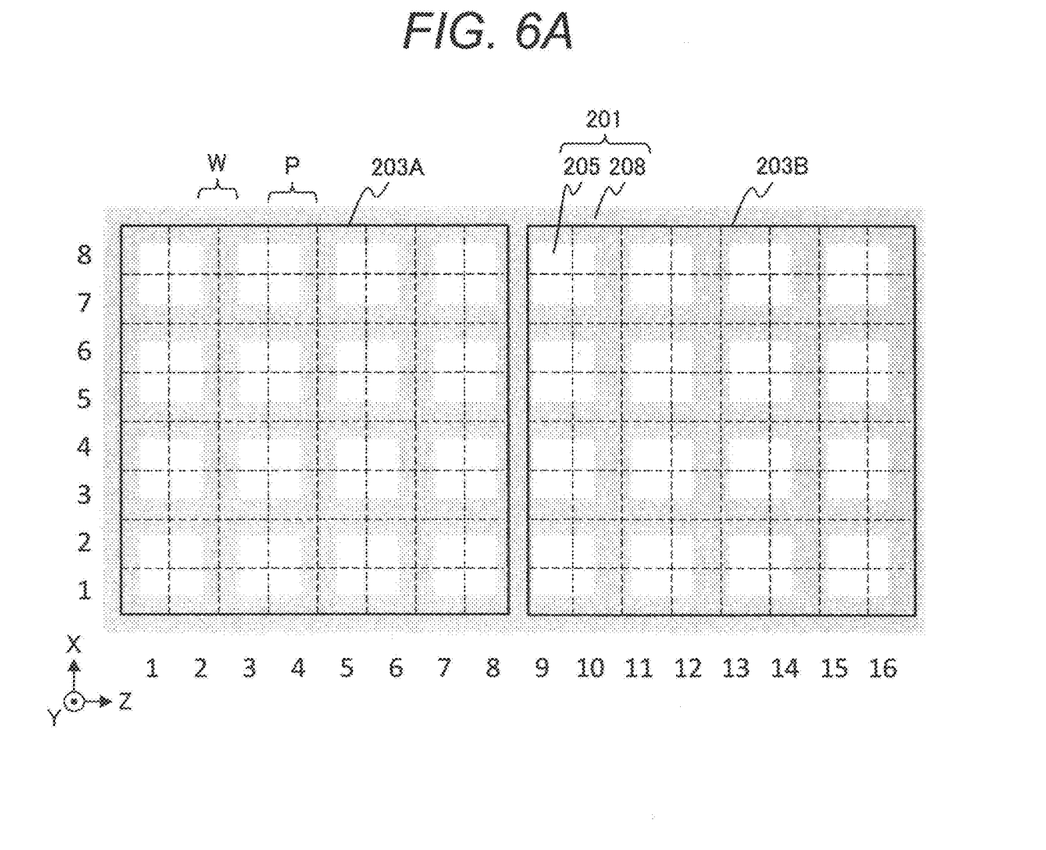
FIG. 6A is an explanatory diagram illustrating one example of a case where one of the semiconductor layers is out of positional alignment with the collimator.
Figure 6B:
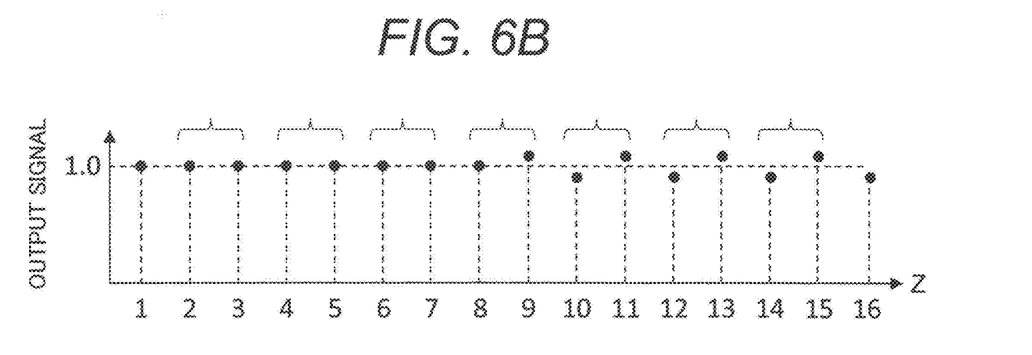
FIG. 6B is an explanatory diagram illustrating one example of output signals from the detecting elements in the case in FIG. 6A.

A case where although the semiconductor layer 203A is correctly aligned with the collimator 201, the semiconductor layer 203B is out of alignment with the collimator 201 in the Z-direction will be described by using FIG. 6A and FIG. 6B. Incidentally, FIG. 6A is a top view illustrating one example of the detecting element module 200 which includes the collimator 201, the semiconductor layer 203A, and the semiconductor layer 203B and the coordinate system in FIG. 6A is the same as that in FIG. 4A. FIG. 6B illustrates a distribution of the output signals from the respective detecting elements in the Z-direction in FIG. 6A. Incidentally, also the output signals in FIG. 6B may be the output signals which are output from one detecting element and may each have a value which is obtained by adding together the values of the output signals from the plurality of detecting elements as in the case in FIG. 5B.

Figure 7A:
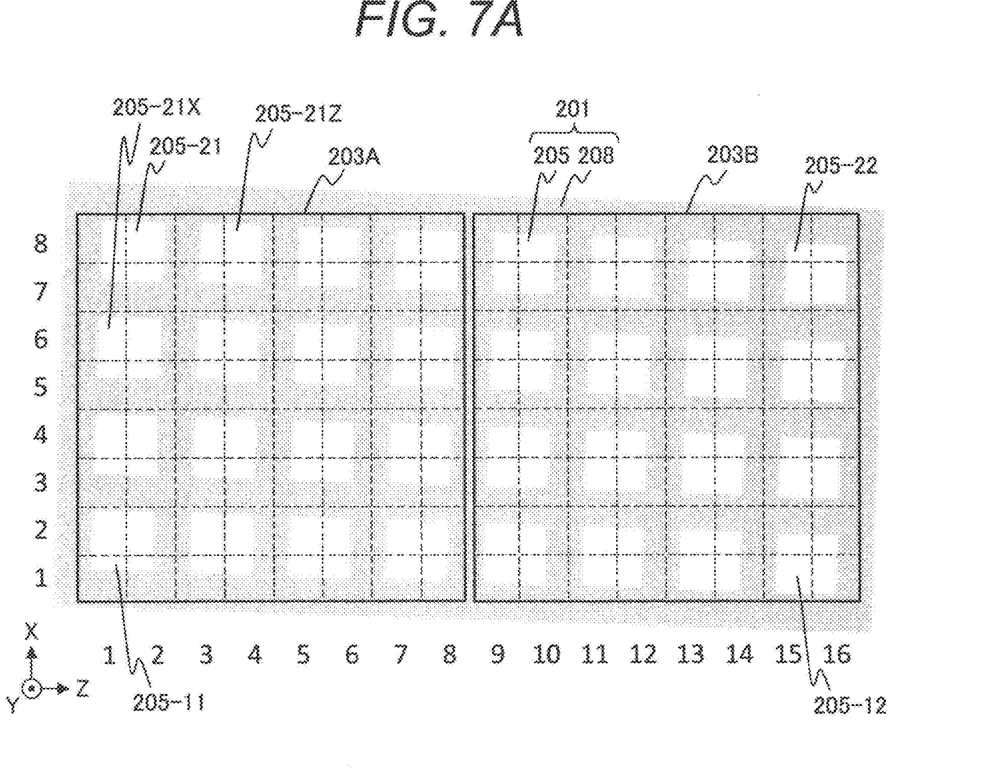
FIG. 7A is an explanatory diagram illustrating one example of a case where the collimator rotates and is out of positional alignment with the semiconductor layers.

In FIG. 6A, since the semiconductor layer 203B is out of alignment with the collimator 201 in the Z-direction, a difference occurs among the output signals from the respective detecting element in the semiconductor layer 203B. Also, in such a case, the collimator 201 may be brought into alignment with the semiconductor layer 203B by using the position adjustment amount ΔAL which is calculated on the basis of the output signals S1 and S2 from two detecting elements which are mutually adjacent with the wall 208 being interposed and is for adjustment in a direction which is orthogonal to the wall 208. For example, the formula (1) is used for calculation of ΔAL. Incidentally, in FIG. 6A and FIG. 6B, since an object to be moved is the semiconductor layer 203B, in a case where ΔAL has a positive value, the semiconductor layer 203B is moved toward the detecting element which outputs the output signal S2. For example, in a case where the output signal from the detecting element which has an odd-numbered Z-coordinate is S1 and the output signal from the detecting element which has an even-numbered Z-coordinate is S2, ΔAL=0 for the semiconductor layer 203A and ΔAL>0 for the semiconductor layer 203B in the distribution of the output signals in FIG. 6B. That is, although position adjustment is not necessary for the semiconductor layer 203A, position adjustment in the Z-direction is preferable for the semiconductor layer 203B and the semiconductor layer 203B is moved in the −Z-direction that the detecting element which outputs the output signal S2 is disposed. A case where the collimator 201 is out of alignment with the semiconductor layer 203A and the semiconductor layer 203B in a direction of rotation that the Y-axis is set as the axis of rotation will be described by using FIG. 7A and FIG. 7B. Incidentally, FIG. 7A is a top view illustrating one example of the detecting element module 200 which includes the collimator 201, the semiconductor layer 203A, and the semiconductor layer 203B, and the coordinate system in FIG. 7A is the same as that in FIG. 4A. In addition, FIG. 7B illustrate a distribution of the output signals from the respective detecting elements in the Z-direction in the case in FIG. 7A and output signals X=8, X=6, X=4, and X=2 are illustrated.

Figure 7B:
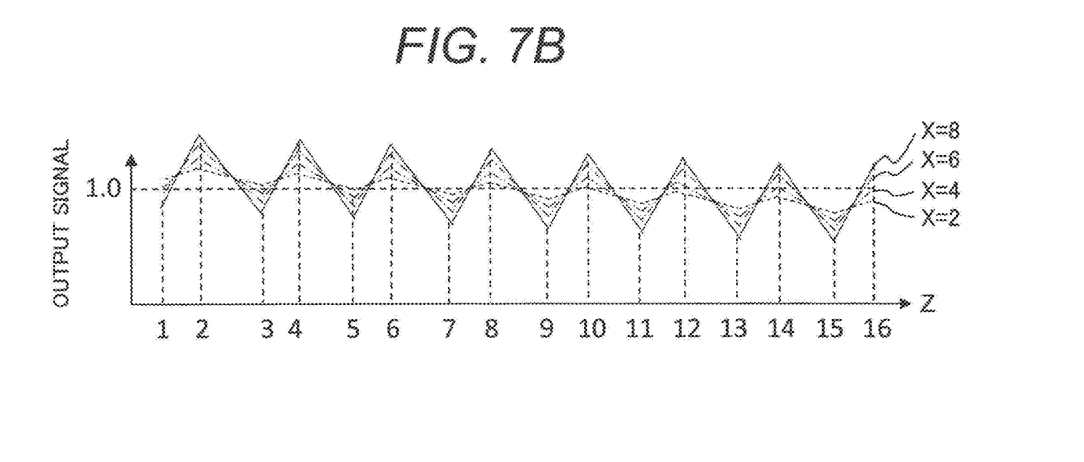
FIG. 7B is an explanatory diagram illustrating one example of the output signals from the detecting elements in the case in FIG. 7A.

In FIG. 7A, since the collimator 201 is out of alignment with the semiconductor layer 203A and the semiconductor layer 203B in a clockwise direction, a difference occurs among the output signals from the respective detecting elements in the semiconductor layer 203B as illustrated in FIG. 7B. In particular, the difference or the ratio between the output signals from the detecting elements which are mutually adjacent with the wall 208 being interposed varies depending on the X-coordinate and the Z-coordinate of the detecting elements. Even in such a case, the position adjustment amount is calculated on the basis of the output signals S1 and S2 from two detecting elements which are mutually adjacent with the wall 208 being interposed. However, since the collimator 201 is moved in the direction of rotation that the Y-axis is set as the axis of rotation, the position adjustment amounts in the X-direction and the Z-direction vary depending on the coordinates of the detecting elements. In particular, since any one of passing holes 205-11, 205-12, 205-21, and 205-22 in four corners of the collimator 201 reaches a maximum in distance from the axis of rotation in all the passing holes 205, the position adjustment amount reaches a maximum in any one of the passing holes 205-11, 205-12, 205-21, and 205-22.

Accordingly, in FIG. 7A And FIG. 7B, the position adjustment amount is calculated on the basis of the output signals from the detecting elements which correspond to the first passing hole and the second passing hole which are two of the passing holes in the four corner of the collimator 201 and from the detecting elements which correspond to the passing holes which are located just on the inner sides of the first passing hole and the second passing hole. The position adjustment amounts are calculated as the amounts to be adjusted in a first direction and a second direction which is orthogonal to the first direction and a direction that the subject 7 is irradiated with the X-rays at respective positions that the first passing hole and the second passing hole are formed. For example, the following formulae are used for calculation of the position adjustment amounts in respective directions at respective positions.

$$\Delta AL11 = (P-W/2) \cdot (S111-S112)/(S111+S112) \quad (2)$$

$$\Delta AL21 = (P-W/2) \cdot (S211-S212)/(S211+S212) \quad (3)$$

$$\Delta AL12 = (P-W/2) \cdot (S121-S122)/(S121+S122)\} \quad (4)$$

$$\Delta AL22 = (P-W/2) \cdot (S221-S222)/(S221+S222)\} \quad (5)$$

Here, $\Delta AL11$ is a position adjustment amount in the first direction and in the first passing hole, $\Delta AL21$ is a position adjustment amount in the first direction and in the second passing hole, $\Delta AL12$ is a position adjustment amount in the second position and in the first passing hole and $\Delta AL22$ is a position adjustment amount in the second direction and in the second passing hole. In addition, P is the length of one side of the detecting element and W is the thickness of the wall 208. Further, S111 and S112 are output signals from detecting elements which are mutually adjacent with the wall 208 between the passing hole which is located just on the inner side of the first passing hole in the first direction and the first passing hole being interposed. In addition, S211 and S212 are output signals from detecting elements which are mutually adjacent with the wall 208 between the passing hole which is located just on the inner side of the first passing hole in the second direction and the first passing hole being interposed. Further, S121 and S122 are output signals from detecting elements which are mutually adjacent with the wall 208 between the passing hole which is located just on the inner side of the second passing hole in the first direction and the second passing hole being interposed. In addition, S221 and S222 are output signals from detecting elements which are mutually adjacent with the wall 208 between the passing hole which is located just on the inner side of the second passing hole in the second direction and the second passing hole being interposed.

More specifically, in a case where the first passing hole is the passing hole 205-21, the passing hole which is located just on the inner side of the first passing hole is a passing hole 205-21Z in the Z-direction which is the first direction and a passing hole 205-21X in the X-direction which is the second direction. In addition, sets of detecting elements which are mutually adjacent with the wall 208 being interposed are sets of detecting elements (2, 8) and (3, 8) in the Z-direction and sets of detecting elements (1, 7) and (1, 6) in the X-direction. Then, any of the passing holes 205-11, 205-12, and 205-22 is used as the second passing hole.

The position adjustment amounts are calculated by using the formulae (2) to (5) and thereby it becomes possible to align the collimator 201 which is out of alignment in the direction of rotation that the Y-axis is set as the axis of rotation with the semiconductor layer 203. In particular, since the position adjustment amounts in the first direction and the second direction are calculated, in particular, at positions of two of the passing holes in the four corners of the collimator 201 where the position adjustment amount reaches the maximum, more accurate alignment becomes possible.

As described above, alignment of the collimator 201 with the semiconductor layer 203 becomes possible by moving the collimator 201 and the semiconductor layer 203 such that the ratio or the difference between the output signals from the detecting elements which are mutually adjacent with the wall 208 of the collimator 201 being interposed falls within the predetermined range. According to the first embodiment, since it becomes possible to align the collimator 201 with the semiconductor layer 203 with the position of the X-ray source 1 being fixed, it becomes possible to suppress an increase in man-hour which is required for alignment.

Incidentally, in a case where it is preferable to perform position adjustment in the direction of rotation that the Y-axis is set as the axis of rotation and position adjustment in the Z-direction or the X-direction, it is desirable to perform the position adjustment in the Z-direction or the X-direction after performing the position adjustment in the direction of rotation. In a case where the position adjustment in the direction of rotation is performed first, it becomes possible to use the added value of the values of the plurality of detecting elements in the position adjustment in the Z-direction or the X-direction and thereby more accurate alignment becomes possible.

Second Embodiment

In the first embodiment, alignment of the semiconductor layer 203 which has the plurality of detecting elements with the collimator 201 in a case where two detecting elements are arrayed along the wall 208 in the passing hole 205 that the collimator 201 has is described. The number of the detecting elements which are arrayed along the wall 208 in the passing hole 205 is not limited to two, the number of the detecting elements may be three or more. In the second embodiment, alignment to be performed in a case where three or more detecting elements are arrayed along the wall 208 in the passing hole 205 will be described. Incidentally, in the second embodiment, since it is possible to apply part of configurations and functions which are described in the first embodiment, the same numerals are used for the same configurations and functions and description thereof is omitted.

Figure 8A:
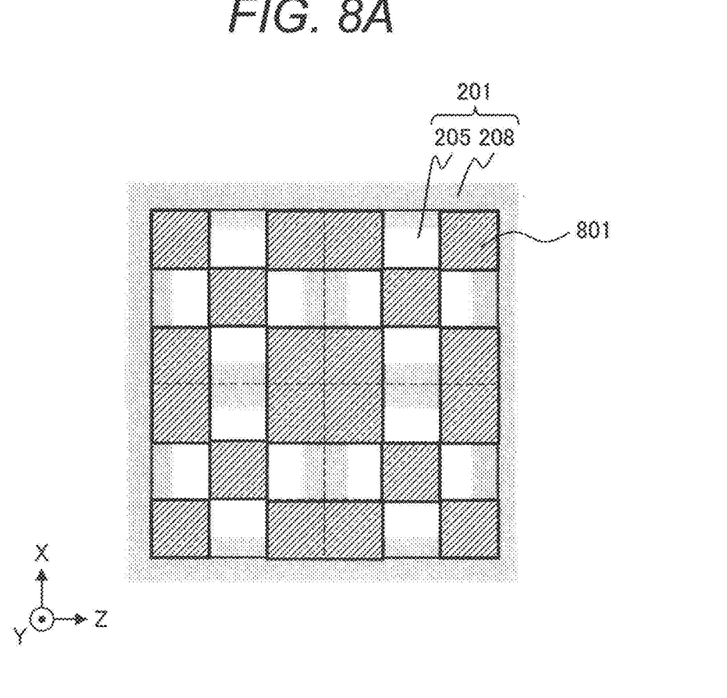
FIG. 8A is an explanatory diagram illustrating one example of a detecting element which is not used in alignment in a case where three detecting elements are arrayed in a passing hole.
Figure 8B:
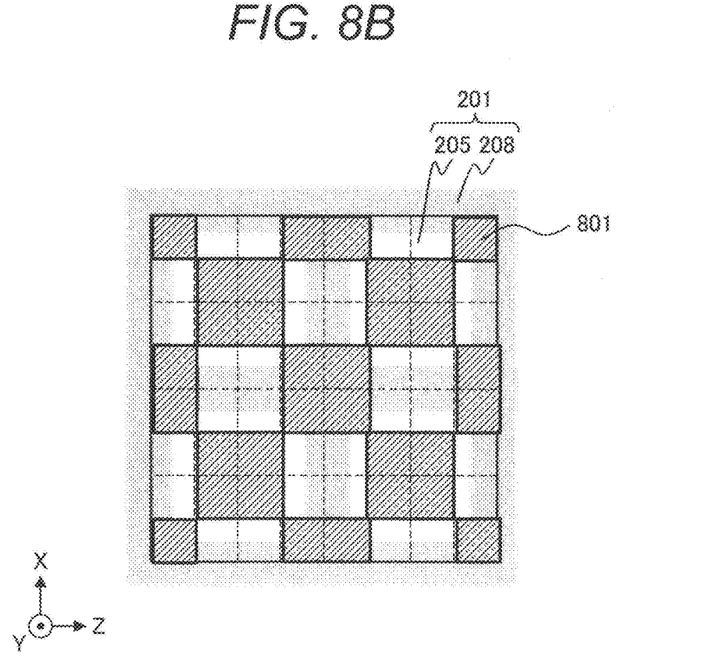
FIG. 8B is an explanatory diagram illustrating one example of a detecting element which is not used in alignment in a case where four detecting elements are arrayed in the passing hole.

A detecting element which is not used for alignment in the second embodiment will be described by using FIG. 8A and FIG. 8B. Incidentally, FIG. 8A is a top view illustrating one example of a case where three detecting elements are arrayed along the wall 208 in the passing hole 205, and FIG. 8B is a top view illustrating one example of a case where four detecting elements are arrayed. Since the values of the output signals from the respective detecting elements become small as the number of the detecting elements which are arrayed in the passing hole 205 is increased, it is desirable to improve SNR by adding the values of the output signals from the plurality of detecting elements. However, it is preferable that the output signal whose value is not changed even in a case where misalignment occurs be not added. In addition, it is also preferable that the output signal with which it is difficult to specify the direction of misalignment be not added.

Accordingly, in the second embodiment, output signals from a detecting element which is not superposed on the wall 208 of the collimator 201 and from detecting elements which are disposed on four corners in the passing hole 205 are not used in value addition. That is, alignment of the semiconductor layer 203 with the collimator 201 is performed without using output signals from exclusive elements 801 which are shaded in FIG. 8A and FIG. 8B as elements to be excluded. Incidentally, the values of the output signals from the detecting elements which are arrayed in a direction which is orthogonal to a direction in which alignment is performed are added together and consequently the values of the output signals from the detecting elements other than the detecting elements which are located at the both ends are added together in the detecting elements which are arrayed along the wall 208 in the passing hole 205. Then, similarly to the first embodiment, the semiconductor layer 203 and the collimator 201 are aligned with each other such that the ratio or the difference between the output signals from the detecting elements which are mutually adjacent with the wall 208 being interposed falls with the predetermined range.

According to the second embodiment, even in a case where the number of the detecting elements which are arrayed in the passing hole 205 is increased and the value of the output signal from each detecting element becomes small, it becomes possible to align the semiconductor layer 203 with the collimator 201 more accurately.

The first and second embodiments of the radiographic imaging apparatus according to the present invention are described above. However, the radiographic imaging apparatus according to the present invention is not limited to the above embodiments and it is possible to embody the radiographic imaging apparatus by modifying constitutional elements within a range not deviating from the gist of the present invention. In addition, the plurality of constitutional elements which are disclosed in the above embodiments may be appropriately combined with one another. Further, some constitutional elements may be deleted from all the constitutional elements which are disclosed in the above embodiments.

REFERENCE SIGNS LIST

1 . . . X-ray source
2 . . . X-ray detector
3 . . . signal processing unit
4 . . . image generation unit
5 . . . rotating plate
6 . . . bed
7 . . . subject
200 . . . detecting element module
201 . . . collimator
202 . . . high-voltage wiring
203, 203A, 203B . . . semiconductor layer
204 . . . photon counting circuit
205 . . . passing hole
206 . . . pixel electrode
207 . . . pixel boundary
208 . . . wall
801 . . . exclusive element

What is claimed is:

1. A radiographic imaging apparatus comprising:
a radiation source which irradiates a subject with radioactive rays;
a plurality of detecting elements which detect photons in the radioactive rays; and
a collimator which is disposed between the radiation source and the detecting elements and has a plurality of walls which form a plurality of passing holes that the radioactive rays pass,
wherein the detecting elements and the collimator are aligned with each other in a direction which is orthogonal to a direction that the subject is irradiated with the radioactive rays such that a ratio or a difference between output signals from the detecting elements which are mutually adjacent with the wall being interposed falls within a predetermined range.

2. The radiographic imaging apparatus according to claim 1, wherein the ratio between the output signals from the detecting elements which are mutually adjacent with the wall being interposed is calculated on the basis of a value which is obtained by adding together values of the output signals from the plurality of detecting elements which are arrayed along the wall.

3. The radiographic imaging apparatus according to claim 2, wherein in a case where three or more detecting elements are arrayed in each of the passing holes along the wall, the values of the output signals from the detecting elements other than the detecting elements which are located on the both ends are added together.

4. The radiographic imaging apparatus according to claim 1, wherein in a case where P denotes a size of the detecting element, W denotes a thickness of the wall, and S1 and S2 denote the output signals from the detecting elements which are mutually adjacent with the wall being interposed, a position adjustment amount $\Delta AL$ in a direction which is orthogonal to the wall in a case where the detecting elements and the collimator are to be aligned with each other is calculated by using $$\Delta AL = (P - W/2) \cdot (S1 - S2)/(S1 + S2)$$

and the collimator is moved by $\Delta AL$ toward the detecting element which outputs the output signal S1.

5. The radiographic imaging apparatus according to claim 4, further comprising a display unit which displays the position adjustment amount $\Delta AL$ which is calculated on the basis of the values of the output signals S1 and S2.

6. The radiographic imaging apparatus according to claim 1, wherein in a case where the detecting elements and the collimator are to be aligned with each other in a direction that rotation is performed with a direction that the subject is irradiated with the radioactive rays being set as an axis of rotation, the position adjustment amount is calculated on the basis of the respective output signals from the detecting elements which are mutually adjacent with the wall which is located between a first passing hole which is one of passing holes in four corners of the collimator and a passing hole which is located just on the inner side of the first passing hole being interposed and the respective output signals from the detecting elements which are mutually adjacent with the wall which is located between a second passing hole which is one of the passing holes in the four corners of the collimator and is different from the first passing hole and a passing hole which is located just on the inner side of the second passing hole being interposed.

7. The radiographic imaging apparatus according to claim 6,
wherein in a case where P is the size of the detecting element and W is the thickness of the wall, and
in a first direction, in a case where S111 and S112 are respective output signals from detecting elements which are mutually adjacent with the wall which is located between the passing hole which is located just on the inner side of the first passing hole and the first passing hole being interposed, a position adjustment amount $\Delta AL11$ in the first direction and in the first passing hole is $\Delta AL11=(P-W/2)\cdot(S111-S112)/(S111+S112)$ and in a case where S211 and S212 are respective output signals from detecting elements which are mutually adjacent with the wall which is located between the passing hole which is located just on the inner side of the second passing hole and the second passing hole being interposed, a position adjustment amount $\Delta AL21$ in the first direction and in the second passing hole is $\Delta AL21=(P-W/2)\cdot(S211-S212)/(S211+S212)$, and in a second direction which is orthogonal to the direction that the subject is irradiated with the radioactive rays and to the first direction, in a case where S121 and S122 are respective output signals from detecting elements which are mutually adjacent with the wall which is located between the passing hole which is located just on the inner side of the first passing hole and the first passing hole being interposed, a position adjustment amount $\Delta AL12$ in the second direction and in the first passing hole is $\Delta AL12=(P-W/2)\cdot(S121-S122)/(S121+S122)$ and in a case where S221 and S222 are respective output signals from detecting elements which are mutually adjacent with the wall which is located between the passing hole which is located just on the inner side of the second passing hole and the second passing hole being interposed, a position adjustment amount $\Delta AL22$ in the second direction and in the second passing hole is $\Delta AL22=(P-W/2)\cdot(S221-S222)/(S221+S222)$.

8. The radiographic imaging apparatus according to claim 1,
wherein the detecting elements are formed in a semiconductor layer, and
the collimator and each semiconductor layer are aligned with each other in a direction which is orthogonal to the direction that the subject is irradiated with the radioactive rays such that in a case where a plurality of semiconductor layers are set in correspondence with the collimator, the ratio or the difference between the output signals from the detecting elements which are mutually adjacent with the wall being interposed in each semiconductor layer falls within the predetermined range.

* * * * *